(12) United States Patent
Newcombe et al.

(10) Patent No.: US 6,217,154 B1
(45) Date of Patent: Apr. 17, 2001

(54) EJECTION APPARATUS FOR EJECTING MATERIAL FROM A LIQUID

(75) Inventors: Guy Charles Fernley Newcombe; Matthew Alexander Schumann; Richard Wilhelm Janse Van Rensburg; Neil Emerton; David Mark Blakey, all of Cambridge (GB)

(73) Assignee: Tonejet Corporation Pty. Ltd. (AU)

( * ) Notice: Subject to any disclaimer, the term of this patent is extended or adjusted under 35 U.S.C. 154(b) by 0 days.

(21) Appl. No.: 09/101,609

(22) PCT Filed: Jan. 22, 1997

(86) PCT No.: PCT/GB97/00189

§ 371 Date: Jul. 17, 1998

§ 102(e) Date: Jul. 17, 1998

(87) PCT Pub. No.: WO97/27058

PCT Pub. Date: Jul. 31, 1997

(30) Foreign Application Priority Data

Jan. 22, 1996 (GB) ................................................ 9601223

(51) Int. Cl.$^7$ ........................................................ B41J 2/06
(52) U.S. Cl. ................................................................ 347/55
(58) Field of Search .............................. 347/55, 154, 103, 347/123, 111, 159, 127, 128, 17, 141, 120; 399/271, 290, 291, 292, 293, 294, 295

(56) References Cited

U.S. PATENT DOCUMENTS 4,504,844 * 3/1985 Ebi et al. ............................... 347/55

* cited by examiner

Primary Examiner—John Barlow
Assistant Examiner—Raquel Yvette Gordon
(74) Attorney, Agent, or Firm—Dykema Gossett PLLC

(57) ABSTRACT

An ejection apparatus for ejecting material from a liquid has an ejection cell (2) for containing the liquid in use. The cell (2) has a protrusion (3) disposed so as to be contacted by liquid in the cell on more than one side and defining a predetermined location for a meniscus of the liquid at an opening in the cell. An ejection electrode (6) is disposed in the cell at a position inwardly of the cell with respect to the predetermined location of the meniscus.

9 Claims, 5 Drawing Sheets

EJECTION APPARATUS FOR EJECTING MATERIAL FROM A LIQUID

BACKGROUND OF THE INVENTION

The present invention relates to an electrode for a printer employing technology the same as or similar to that described in WO-A-93-11866, PCT/GB95/01215 and WO-A-94-18011.

In order to achieve effective ejection from apparatus of this type, it is desirable that the carrier or support liquid containing the material to be ejected extends as far forwardly as possible towards the tip of the ejection location.

SUMMARY OF THE INVENTION

According to the present invention an ejection apparatus for ejecting material from a liquid, comprises
an ejection cell for containing the liquid in use, the cell having a protrusion disposed in the cell and defining a predetermined location for a meniscus of the liquid at an opening in the cell; and
an ejection electrode disposed in the cell at a position inwardly of the cell with respect to the predetermined location.

The protrusion may disposed so as to be contacted by liquid in the cell on more than one side.

The means for defining a predetermined location for a meniscus of the liquid preferably comprises a substantially triangularly shaped insulating separator.

By arranging the separators in this form, it has been found that the meniscus of the carrier liquid extends further forward than in the case of a cell of cylindrical design.

Preferably, a portion of the electrode also has a triangular shape tapering to an apex away from the opening, but does not extend as far forward as the tip of the separator and so lies at a position behind the predetermined location of the liquid's meniscus.

In an alternative construction, the cells between the separators are further defined by inner walls so that each cell has a pair of limbs each extending along one of the outer surfaces of the separators. Liquid may then flow in a path along one of the cell limbs to the ejection location and then away from the ejection location along the other limb.

In another alternative construction, the means for defining the predetermined location of the meniscus comprises a substantially triangular insulating separator and a substantially rectangular insulating separator.

Preferably, in this construction, the cells between the separators are also further defined by inner walls so that each cell forms a channel in which liquid may flow. A triangular separator at an ejection location has an apex, the shape of which defines the predetermined location of the meniscus.

BRIEF DESCRIPTION OF THE SEVERAL VIEWS OF THE DRAWING

One example of a printer incorporating electrodes according to the present invention, will now be described with reference to the accompanying drawings in which.

DETAILED DESCRIPTION OF THE INVENTION

The printhead 1 is designed to operate in the manner described in the above International applications and is shown, in the present example, as comprising four parallel cells 2 which are separated from one another by triangularly shaped separator walls 3 and in each of which flows, in use, a carrier liquid 4 for particulate pigmented material which is used to form an image on an underlying substrate. The mechanism of operation is as described in the PCT applications and will not be further described herein in detail.

Figure 1:
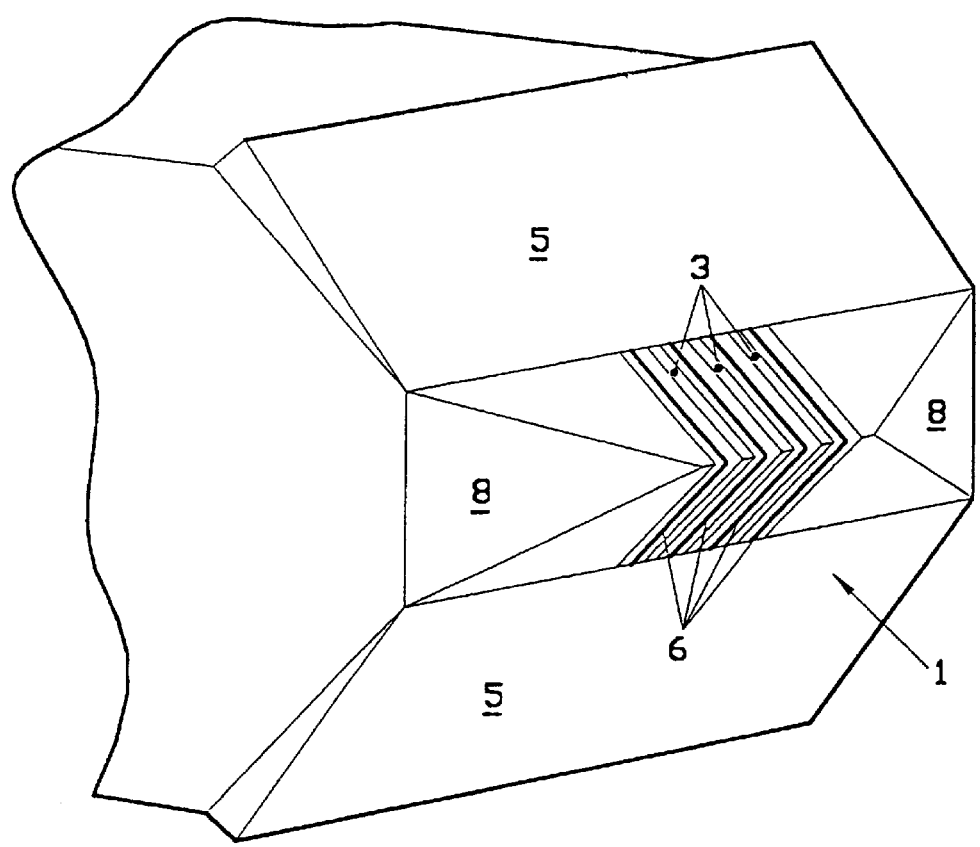
FIG. 1 is an isometric front view of a portion of a printhead.
Figure 2:
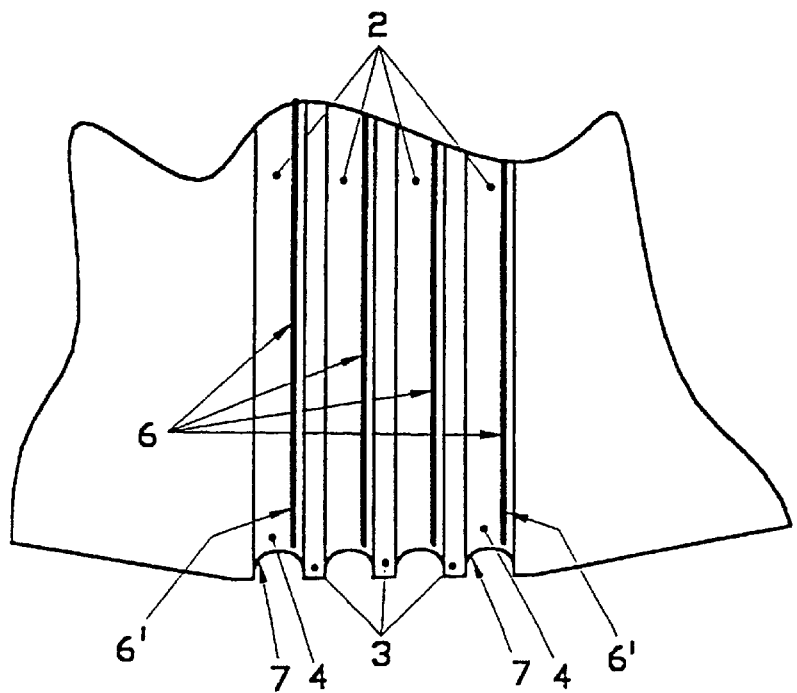
FIG. 2 is a side view of part of the printhead of FIG. 1.

The rearwards part of each of the cells 2 is closed by side walls 5 which thus, in this example, define a chamber or chambers (not shown) behind the cells 2. The ends of the printhead are formed by tapering walls 8. Each of the cells 2 has a tip or front portion with an opening in which extends the forward part 6' of an ejection electrode 6, each of which electrodes is of triangular shape as shown best in FIG. 1. FIG. 2 illustrates the positioning of the meniscus 7 of the carrier fluid and shows the position of the electrode tip portion 6' in each of the cells, behind the meniscus 7.

The triangular shape of the separator walls 3 at their front edge allows each meniscus 7 to extend further forwards than if the separators were flat or straight edged at the front and this improves ejection of the material from the carrier liquid.

Figure 3:
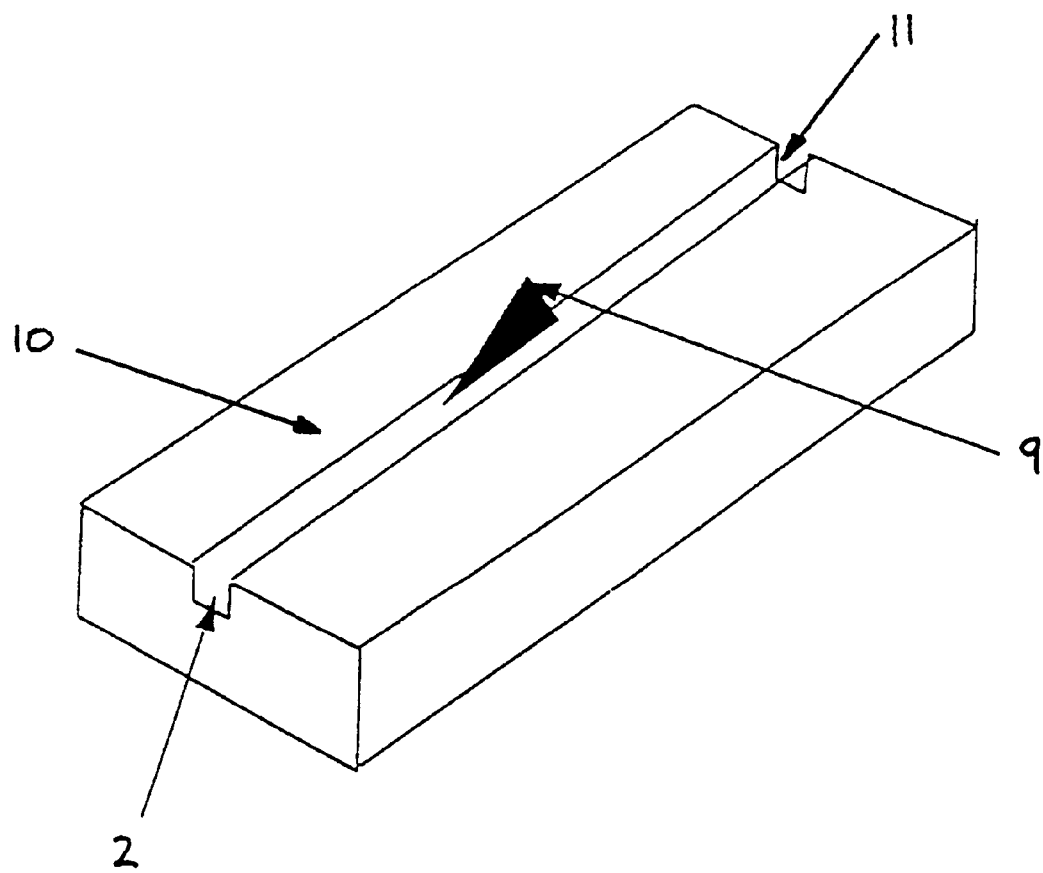
FIG. 3 is an isometric front view of an alternative embodiment of a portion of a printhead.

FIG. 3 shows an alternative embodiment in which the cell 2 formed between the rectangular separators 10 is trough-like. The triangular separator 9 formed in the cell at the ejection location causes the meniscus of the carrier fluid to protrude from the plane of the cell to a predetermined location. The electrode 11 formed on the walls of the cell 2 lies behind this predetermined location.

It should be noted that although FIG. 3 illustrates a single cell it is intended that plural cells in close proximity may be used.

Figure 4:
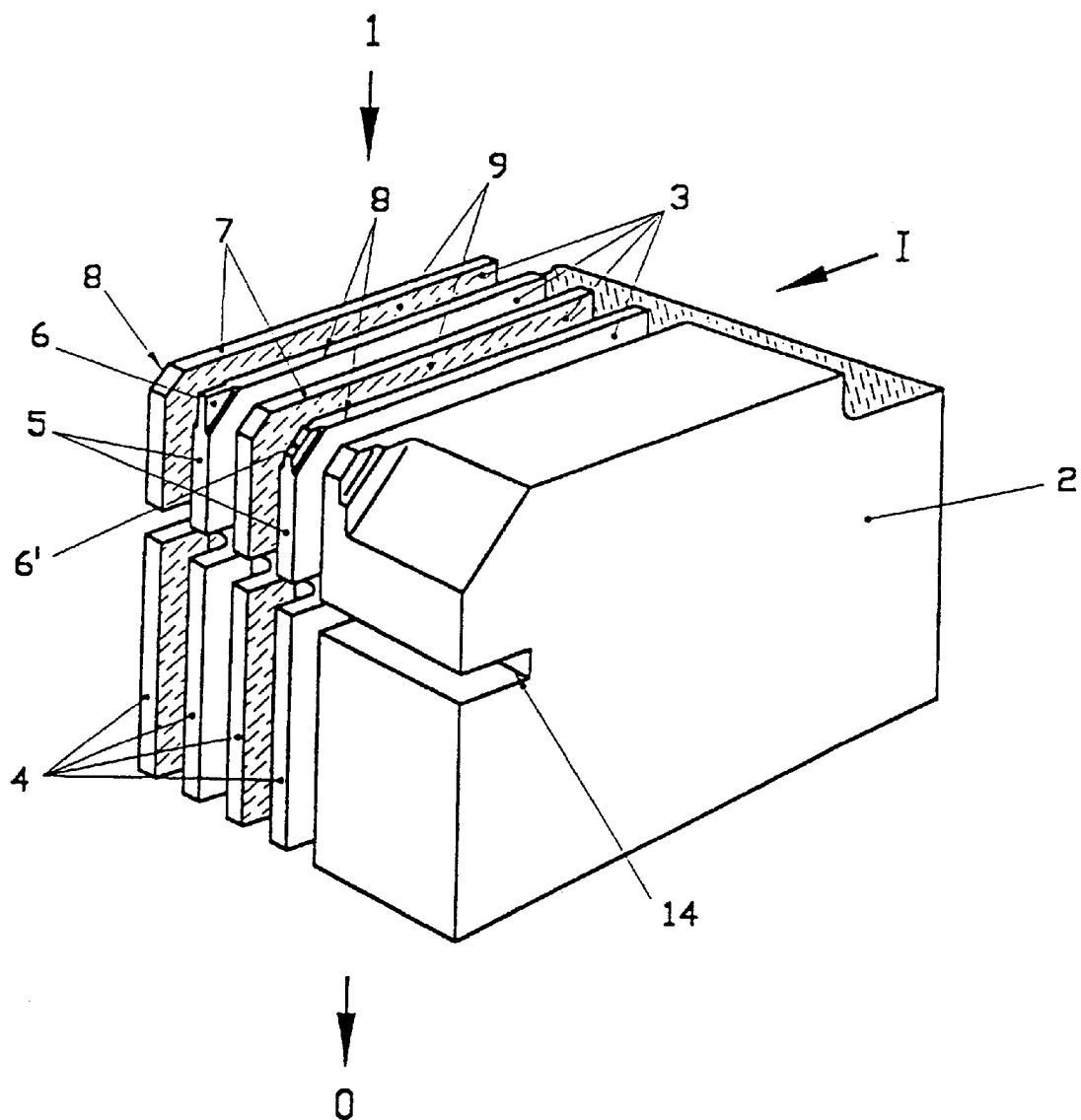
FIG. 4 is a partial perspective view of a portion of a further printhead incorporating ejection apparatus according to the present invention.
Figure 5:
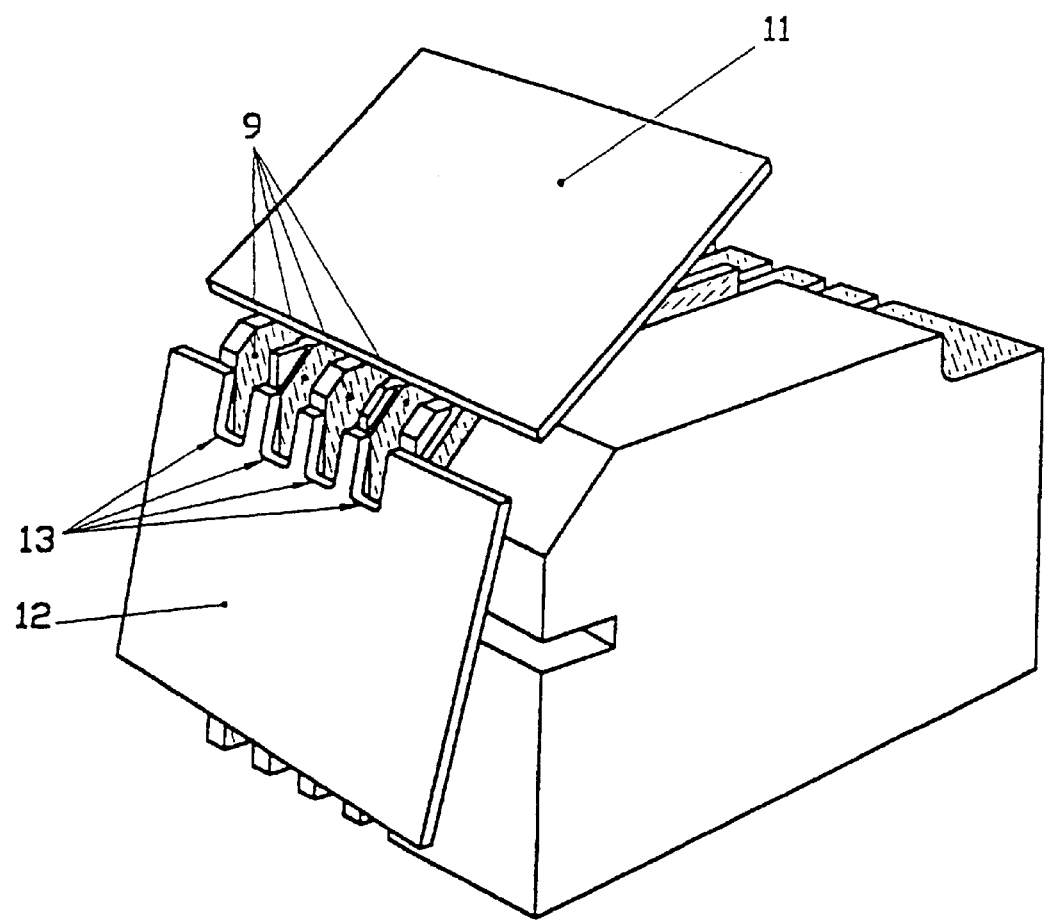
FIG. 5 is a view similar to FIG. 4 showing further and alternative features of the ejection apparatus.
Figure 6:
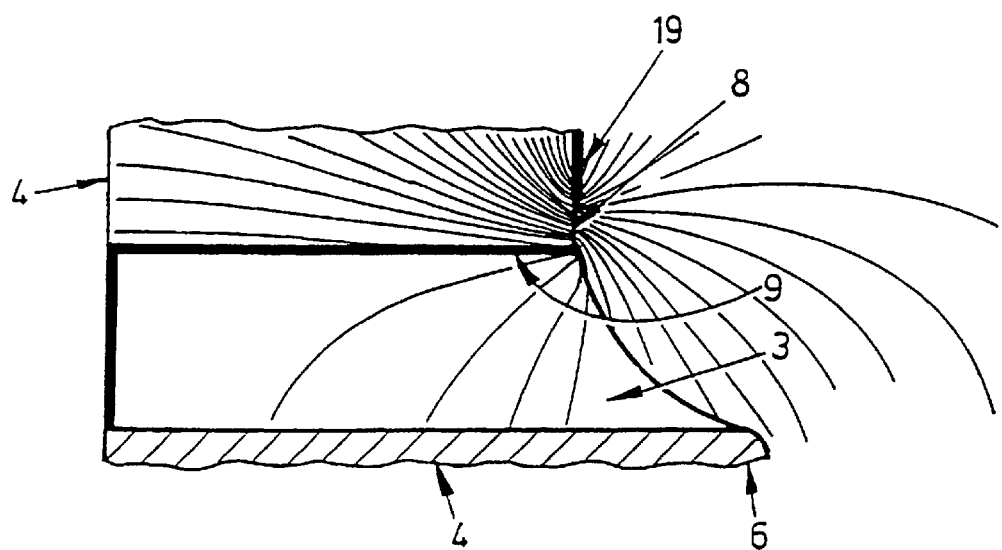
FIG. 6 is a partial sectional views through a cell of FIG. 4.

Other examples are illustrated in FIGS. 4 to 6. FIG. 4 illustrates part of an array-type printhead 1, the printhead comprising a body 2 of a dielectric material such as a synthetic plastics material or a ceramic. A series of grooves 3 are machined in the body 2, leaving interposing plate-like lands 4. The grooves 3 are each provided with a ink inlet and ink outlet (not shown, but indicated by arrows I & O) disposed at opposite ends of the grooves 3 so that fluid ink carrying a material which is to be ejected (as described in our earlier applications) can be passed into the grooves and depleted fluid passed out.

Each pair of adjacent grooves 3 define a cell 5, the plate-like land or separator 4 between the pairs of grooves 3 defining an ejection location for the material and having an ejection upstand 6, 6'. In the drawing two cells 5 are shown, the left-hand cell 5 having an ejection upstand 6 which is of generally triangular shape and the right-hand cell 5 having a truncated ejection upstand. Each of the cells 5 is separated by a cell separator 7 formed by one of the plate-like lands 4 and the corner of each separator 7 is shaped or chamfered as shown so as to provide a surface 8 to allow the ejection upstand to project outwardly of the cell beyond the exterior of the cell as defined by the chamfered surfaces 8. A truncated ejection upstand 6' is used in the end cell 5 to reduce end effects resulting from the electric fields which in turn result from voltages applied to ejection electrodes 9 provided as metallised surfaces on the faces of the plate-like lands 4 facing the ejection upstand 6, 6' (ie. the inner faces of each cell separator). As can be seen from FIG. 6, the ejection electrodes 9 extend over the side faces of the lands 4 and the bottom surfaces 10 of the grooves 3. The precise extent of the ejection electrodes 9 will depend upon the particular design and purpose of the printer.

FIG. 5 illustrates two alternative forms for side covers of the printer, the first being a simple straight-edged cover 11 which closes the sides of the grooves 3 along the straight line as indicated in the top part of the figure. A second type of cover 12 is shown on the lower part of the figure, the cover still closing the grooves 3 but having a series of edge slots 13 which are aligned with the grooves. This type of cover construction may be used to enhance definition of the position of the fluid meniscus which is formed in use and the covers, of whatever form, can be used to provide surfaces onto which the ejection electrode and/or secondary or additional electrodes can be formed to enhance the ejection process.

FIG. 5 also illustrates an alternative form of the ejection electrode 9, which comprises an additional metallised surface on the face of the land 4 which supports the ejection upstand 6, 6'. This may help with charge injection and may improve the forward component of the electric field.

FIG. 6 illustrates a partial sectional view through one side of the one of the cells 5 of FIG. 4, with a secondary electrode 19 being shown located on the chamfered face 8 on the cell separator lands 4 and therefore disposed substantially alongside the ejection upstand. In a further embodiment (not shown) the secondary electrode may be formed, at least in part, on the face of the cell separator land 4 (and thus rearwardly of the ejection upstand), with the ejection electrode also on the face, but separated therefrom.

What is claimed is:

1. An ejection apparatus for ejecting material from a liquid, comprises:

an ejection cell for containing the liquid in use, the cell having a protrusion disposed in the cell and defining a predetermined location for a meniscus of the liquid at an opening in the cell; and an ejection electrode disposed in the cell at a position inwardly of the cell with respect to the predetermined location.

2. Apparatus according to claim 1, wherein the protrusion is disposed so as to be contacted by liquid on more than one side.

3. Apparatus according to claim 2, wherein the protrusion for defining the predetermined location for the meniscus of the liquid is substantially triangularly shaped.

4. Apparatus according to claim 1, wherein the protrusion for defining the predetermined location for the meniscus of the liquid is substantially triangularly shaped.

5. Apparatus according to claim 1, wherein the cells are defined between separator walls.

6. Apparatus according to claim 5, wherein each cell has a pair of limbs each extending adjacent to the outer surfaces of the separators, wherein liquid may flow in a path along one of the cell limbs to the ejection location and then away from the ejection location along the other limb.

7. Apparatus according to any of claim 1, wherein the predetermined location of the meniscus is also partly defined by a substantially rectangular insulating separator.

8. Apparatus according to claim 1, wherein a portion of the ejection electrode also has a triangular shape tapering to an apex away from the opening, but does not extend as far forward as the tip of the triangular separator and so lies at a position behind the predetermined location of the liquid's meniscus.

9. The ejection apparatus according to claim 1, comprising a plurality of said ejection cells.

* * * * *